United States Patent [19]

Kim

[11] Patent Number: 5,989,450
[45] Date of Patent: Nov. 23, 1999

[54] ETCHANT FOR ETCHING GLASS SUBSTRATE

[75] Inventor: Woong Kwon Kim, Anyang, Rep. of Korea

[73] Assignee: LG Electronics Inc., Seoul, Rep. of Korea

[21] Appl. No.: 08/917,501

[22] Filed: Aug. 26, 1997

[30] Foreign Application Priority Data

Aug. 26, 1996 [KR] Rep. of Korea ..................... 96-35532

[51] Int. Cl.⁶ ....................................................... B44C 1/22
[52] U.S. Cl. ........................... 252/79.4; 252/79.3; 216/97; 216/109
[58] Field of Search ................................. 252/79.3, 79.4; 216/97, 109; 438/756, 704

[56] References Cited

U.S. PATENT DOCUMENTS 5,112,437  5/1992  Watanabe et al. ................. 252/79.3 X
5,164,018  11/1992  Barcelona .......................... 252/79.3 X

FOREIGN PATENT DOCUMENTS 3-103338  4/1991  Japan .

Primary Examiner—William Powell
Attorney, Agent, or Firm—Morgan, Lewis & Bockius LLP

[57] ABSTRACT

An etchant for etching a glass substrate includes distilled water containing HF of more than 5 vol % and about 5 vol % of alcohol. The HF etches a glass substrate and the alcohol dissolves the residue particles attached to a surface of the substrate to apply the etchant to the total area for uniform thickness and smooth surface.

15 Claims, 1 Drawing Sheet

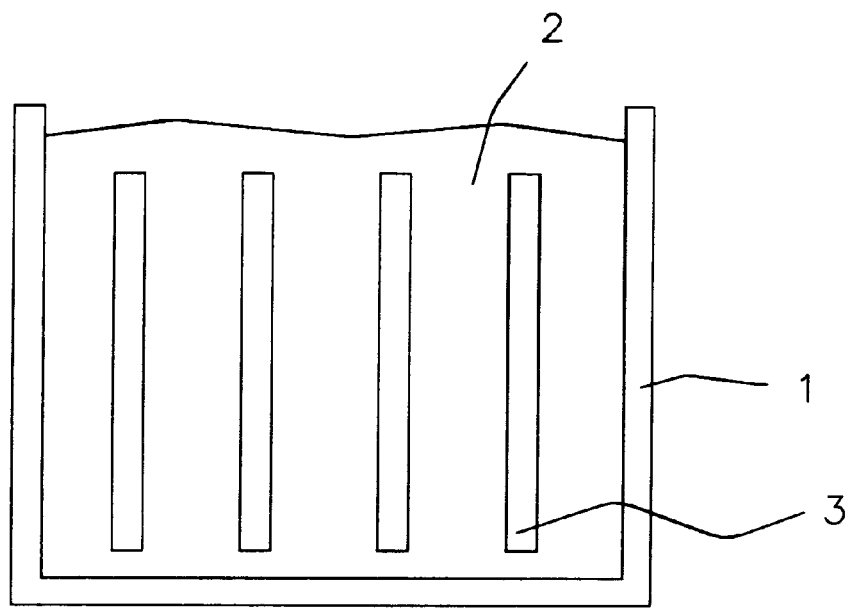
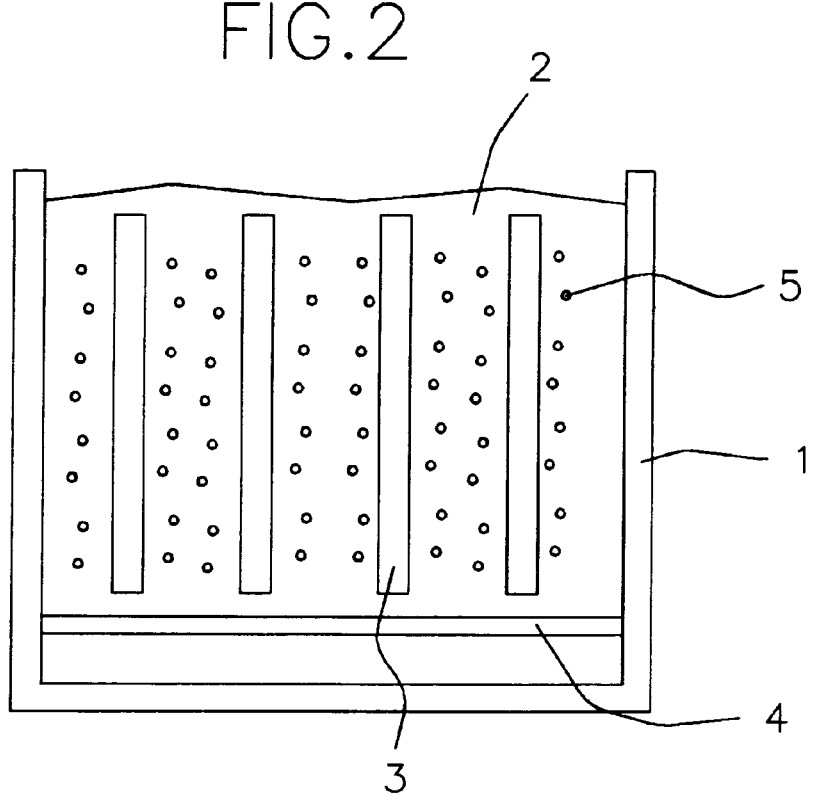

ETCHANT FOR ETCHING GLASS SUBSTRATE

This application claims the benefit of Korean Application No. 35532/1996 filed on Aug. 26, 1996, which is hereby incorporated by reference.

BACKGROUND OF THE INVENTION

1. Field of Invention

The present invention relates to an etchant, and more particularly, to an etchant for etching a glass substrate uniformly and smoothly.

2. Discussion of the Related Art

As a display device, such as for a television and a personal computer, a large size cathode ray tube(CRT) display device has been used. However, since the screen must be separated from the electron gun by more than a predetermined distance for a large size screen CRT, the volume is increased. Thus, such CRT cannot be applied to a low weight, small size, and low power consumption electronic device such as a wall-mountable television, a portable television, and a notebook computer.

For a small and light display device, a flat panel display devices such as LCD(liquid crystal display), PDP(Plasma display panel), ELD(electroluminescent display), and VFD (vacuum fluorescent display) have been introduced recently. Among the above flat panel display devices, the LCD has been dominantly researched for good picture quality and low power consumption. The LCD-applied portable television and notebook computer have recently been on the market, but there are also problems to be solved in such LCD-applied devices. Particularly, size and weight are important factors to be considered for the LCD.

For small size and light LCDs, there are several methods for reducing the size and weight of the LCD element. However, the driving circuit and the thin film transistor, which are necessary elements of the LCD, are so thin that reducing these elements will not affect the weight in any significant manner. On the other hand, it is possible to reduce the weight of the glass substrate which is a basic element of the LCD. Specifically, since the glass substrate is a heavy element of the LCD, the method of reducing the weight of the glass substrate has been continuously researched.

A light glass substrate means a thin glass substrate. However, thinning of glass substrate causes damage and surface roughness. Thus, the mechanical strength is weakened and the image quality of LCD is deteriorated.

FIG. 1 is a view showing a general method of etching the glass substrate. As shown in FIG. 1, a container 1 is filled with etchant 2 formed of distilled water containing HF. The glass substrates 3 are set within the container 1 in series. The etchant 2 etches the glass substrates 3. However, in this method, when the surface of the glass substrate 3 is etched by the etchant 2, the non-dissolved residue particles are again attached to the surfaces of the glass substrates 3. As a result, the etchant 2 cannot etch the residue particles attached to the substrates 3. Therefore, the glass substrate 3 is not etched uniformly and its surface becomes rough. This non-uniformity of the surface causes a deterioration in image quality of the LCD.

In addition, since the thickness of the glass substrate 3 is not uniform, it can be easily damaged from pressure during use of the LCD.

FIG. 2 is a view showing another etching method of the glass substrate. The feature of this method is that the bubbles 5 are generated by a porous plate 4 within the etchant formed of distilled water containing HF. Not shown in FIG. 2, a gas supplying tube connected to a gas tank is mounted outside of the container 1 to supply the gas to the container 1. The bubbles 5 are supplied to the container 1 through the porous plate 4.

As the bubbles 5 rise up, they separate the non-dissolved residue particles from the surface of the glass substrate 3, so that the total area of the surface of the glass substrate 3 is uniformly etched.

In this method, however, the force of the bubbles 5 exerting on the residue particles attached to the surface of the glass substrate 3 is very weak. Thus, the residue that is tightly attached onto the surface cannot be removed in a practical sense. In addition, since the residue particles separated from the glass substrate 3 are not dissolved in the etchant 2, the etchant causes the pollution which must be filtered.

SUMMARY OF THE INVENTION

Accordingly, the present invention is directed to an etchant for etching glass substrate that substantially obviates one or more of the problems due to limitations and disadvantages of the related art.

An object of the present invention is to provide an etchant that can dissolve residue particles attached onto a surface of a glass substrate for uniform etching.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the etchant for etching glass substrate includes distilled water having HF of more than 5 vol % and about 5 vol % of alcohol. The HF etches the surface of the glass substrate and the alcohol dissolves the etched residue particles which are not dissolved by the HF and attached onto the surface.

In another aspect of the present invention, an etchant for etching a substrate comprises distilled water, HF of at least 5 vol %, and alcohol of approximately 5 vol %, the alcohol being selected from the group consisting of ethanol, methanol, propanol, butanol, and isopropylalcohol.

In a further aspect of the present invention, an etchant for etching a glass substrate for a liquid crystal display, the etchant comprising distilled water, HF, and alcohol, the alcohol being selected from the group consisting of ethanol, methanol, propanol, butanol, and isopropylalcohol, the HF being at least 5 vol %, and the alcohol being approximately 5 vol %.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a view showing a method of etching a glass substrate; and

FIG. 2 is a view showing another method of etching a glass substrate.

DETAILED DESCRIPTION OF THE PREFERRED EMBODIMENTS

Reference will now be made in detail to the preferred embodiments of the present invention, examples of which are illustrated in the accompanying drawings.

The basic concept of the present invention is that alcohol added in an etchant dissolves residue particles attached to a surface of a glass substrate. Although FIGS. 1 and 2 are views showing conventional methods of etching the glass substrate, FIGS. 1 and 2 also apply to the present invention, which will be described with reference to these drawings. A difference between the present invention and the prior art is that alcohol is included in the etchant.

The conventional etchant 2 contains HF, which etches the glass substrates 3 set within the container 1 in series, as shown in FIG. 1. As shown in FIG. 2, a porous plate 4 generates bubbles 5 separating the etched residue particles from the surface of the glass substrate 3 for uniform etching.

In the present invention, the HF contained in the etchant is at least 5 vol % and an alcohol such as ethanol, methanol, propanol, butanol, and isopropylalcohol is about 5 vol %. The HF in the etchant etches the glass substrates 3 and the alcohol dissolves the etched residue particles which are not dissolved and attach onto the surface of the glass substrate 3. Therefore, the residue particles on the glass substrate 3 are removed by the alcohol of the present invention to uniformly apply the etchant to the surface of the glass substrate 3. Thus, the entire glass substrate 3 is uniformly etched. Moreover, since the residue is perfectly dissolved, pollution is prevented.

In a case where the etchant of the present invention is used in the method of FIG. 2, the residue particles on the surface of the glass substrate 3 are more perfectly removed by the bubbles 5, so that the substrate 3 is more uniformly etched.

In the above mentioned etchant of the present invention, since the distilled water containing HF and alcohol is used as the etchant, the residue particles attached to the surface of the glass substrate can be removed perfectly. Thus, the etchant is uniformly applied to the total area of the substrate, so that the substrate has a uniform thickness and smooth surface. As a result, the strength of the substrate is increased and the yield is improved. Moreover, due to the smooth surface, the image quality is improved as well. In addition, since the residue particles can be perfectly dissolved, pollution is prevented.

Accordingly, the etchant of the present invention etches a glass substrate uniformly and smoothly to increase its mechanical strength.

It will be apparent to those skilled in the art that various modifications and variations can be made in the etchant for etching glass substrate of the present invention without departing from the spirit or scope of the invention. Thus, it is intended that the present invention cover the modifications and variations of this invention provided they come within the scope of the appended claims and their equivalents.

What is claimed is:

1. An etchant for etching a glass substrate comprising distilled water including alcohol and a sufficient amount of HF to etch the glass substrate.

2. The etchant according to claim 1, wherein the alcohol is selected from the group consisting of ethanol, methanol, propanol, butanol, and isopropylalcohol.

3. The etchant according to claim 1, wherein the HF is at least 5 vol %.

4. The etchant according to claim 1, wherein the alcohol is approximately 5 vol %.

5. An etchant for etching a substrate comprising distilled water, HF of at least 5 vol %, and alcohol of approximately 5 vol %, the alcohol being selected from the group consisting of ethanol, methanol, propanol, butanol, and isopropylalcohol.

6. An etchant for etching a glass substrate for a liquid crystal display, the etchant comprising distilled water, alcohol, and a sufficient amount of HF to etch the glass substrate.

7. The etchant according to claim 6, wherein the alcohol is selected from the group consisting of ethanol, methanol, propanol, butanol, and isopropylalcohol.

8. The etchant according to claim 6, wherein the HF is at least 5 vol %.

9. The etchant according to claim 6, wherein the alcohol is approximately 5 vol %.

10. An etchant for etching a glass substrate comprising alcohol and a sufficient amount of acid to etch the glass substrate.

11. The etchant according to claim 10, wherein the acid includes HF.

12. The etchant according to claim 10, wherein the alcohol is selected from the group consisting of etchaned, methanol, propanol, butanol, and isopropylalcohol.

13. The etchant according to claim 10, wherein the acid is at least 5 vol %.

14. The etchant according to claim 10, wherein the alcohol is approximately 5 vol %.

15. An etchant for etching a glass substrate for a liquid crystal display, the etchant comprising distilled water, HF, and alcohol, the alcohol being selected from the group consisting of ethanol, methanol, propanol, butanol, and isopropylalcohol, the HF being at least 5 vol %, and the alcohol being approximately 5 vol %.

* * * * *